United States Patent [19]

Moyer et al.

[11] Patent Number: 4,635,193
[45] Date of Patent: Jan. 6, 1987

[54] DATA PROCESSOR HAVING SELECTIVE BREAKPOINT CAPABILITY WITH MINIMAL OVERHEAD

[75] Inventors: William C. Moyer, Austin, Tex.; John E. Zolnowsky, Menlo Park, Calif.; David S. Mothersole, Austin, Tex.

[73] Assignee: Motorola, Inc., Schaumburg, Ill.

[21] Appl. No.: 867,404

[22] Filed: May 13, 1986

Related U.S. Application Data

[63] Continuation of Ser. No. 625,065, Jun. 27, 1984, abandoned.

[51] Int. Cl.$^4$ .......................... G06F 9/22; G06F 11/00
[52] U.S. Cl. ...................................... 364/200; 371/16; 371/19
[58] Field of Search ............... 371/8, 16, 19, 17, 67; 364/200 MS File, 900 MS File

[56] References Cited

U.S. PATENT DOCUMENTS

| | | | |
|---|---|---|---|
| 3,813,531 | 5/1974 | King et al. | 371/17 |
| 3,904,860 | 9/1975 | Huber et al. | 235/153 AC |
| 3,937,938 | 2/1976 | Matthews | 235/153 AK |
| 4,041,471 | 8/1977 | Krossa et al. | 364/200 |
| 4,080,650 | 3/1978 | Beckett | 364/200 |
| 4,114,730 | 9/1978 | Means et al. | 187/29 R |
| 4,206,503 | 6/1980 | Woods et al. | 364/200 |
| 4,276,595 | 6/1981 | Brereton et al. | 364/200 |
| 4,293,950 | 10/1981 | Shimizu et al. | 371/21 |
| 4,325,121 | 4/1982 | Gunter et al. | 364/200 |
| 4,338,660 | 7/1982 | Kelley et al. | 364/200 |
| 4,493,027 | 1/1985 | Katz et al. | 364/200 |
| 4,502,116 | 2/1985 | Fowler et al. | 364/200 |
| 4,541,048 | 9/1985 | Propster et al. | 364/200 |
| 4,554,630 | 11/1985 | Sargent et al. | 364/200 |

FOREIGN PATENT DOCUMENTS

| | | | |
|---|---|---|---|
| 54-69348 | 6/1979 | Japan | 371/67 |
| 80/00446 | 10/1981 | PCT Int'l Appl. | |

OTHER PUBLICATIONS

C. J. Sippl et al, *Computer Dictionary &Handbook*, (Howard W. Sams & Co., Inc., Indianapolis, Ind., 1980), p. 249.

Primary Examiner—Archie E. Williams
Attorney, Agent, or Firm—John Fisher; Jeffrey Van Myers; Robert L. King

[57] ABSTRACT

A data processor communicates with a peripheral device and selectively sets breakpoints with minimal overhead. The data processor utilizes an instruction register to store instructions to be executed. Control means communicate with the peripheral device to selectively set a breakpoint in a software program. When repetitions of the breakpoint are encountered, an exception handler is only executed at the desired breakpoint to minimize overhead. A control portion of the processor selectively receives a breakpoint instruction and stores the breakpoint instruction in the instruction register.

5 Claims, 9 Drawing Figures

DATA PROCESSOR HAVING SELECTIVE BREAKPOINT CAPABILITY WITH MINIMAL OVERHEAD

This is a continuation of application Ser. No. 625,065, filed June 27, 1984, now abandoned.

CROSS REFERENCE TO RELATED APPLICATION

This application is related to the following copending application assigned to the assignee hereof:

"Virtual Memory Data Processor", Ser. No. 06/446,801, issued as U.S. Pat. No. 4,488,228.

FIELD OF THE INVENTION

This invention relates generally to data processors, and more particularly, to a data processor having breakpoint instruction capability.

BACKGROUND OF THE INVENTION

In a data processor, breakpoints are typically used to debug software errors in computers. A breakpoint is literally a point in a software program where a break in the program is taken and data in memory is read to ascertain the status of the program at that point. From this information, a programmer may determine what is happening in the program at selected points. Initially, breakpoints were realized in processing systems utilizing card reading machines by physically inserting a card which was recognized as an illegal instruction at a predetermined location in the program and causing the program to be terminated and the memory contents written. If multiple breakpoints were desired, the illegal instruction card was moved by the programmer to another breakpoint and the program run again. Later generations of processors expanded the breakpoint function by using multiple breakpoint instructions which would signal an interrupt status but would not terminate the program as other illegal instructions would. This gave a programmer the ability to perform multiple breakpoints in a single run of the program. However, the ability to selectively execute breakpoints in a program having repetitive subroutines was needed. The capability of selectively using breakpoint instructions was not easily executed in this generation because software was required to control the exact location of breakpoints in programs having multiple repetitive sections. Further, every time a breakpoint instruction was received, an exception was forced to occur regardless of whether the breakpoint was desired or not. The overhead involved with implementing breakpoints by software was large because of the time required for exception handling.

Another generation of processors provided the ability to selectively use breakpoints by utilizing external hardware. When multiple breakpoints were used, the associated hardware increased proportionately. The determination of where breakpoints were taken in a software program was made by closely monitoring the external bus activity and the instructions being executed by the processor. A determination of whether or not to take the breakpoint was made by the external hardware which monitors the number of times a memory location is accessed. After a predetermined number of accesses, the breakpoint is forced to occur. However, the presence of an on-board instruction cache in a data processor prevents proper monitoring since no external bus activity may occur.

SUMMARY OF THE INVENTION

Accordingly, an object of the present invention is to provide a data processor having improved breakpoint instruction capability.

A further object of the present invention is to provide a data processor having improved selective breakpoint instruction capability with minimal overhead.

In carrying out the above and other objects, there is provided, in one form, a data processor adapted to communicate operands with a peripheral device. The data processor has an instruction register for storing an instruction to be executed by the processor. Instruction execution control means execute instructions stored in the instruction register. The instruction execution control means also receive an operand from the peripheral device and selectively store the operand in the instruction register in response to the execution of a breakpoint instruction. The breakpoint instruction may be selectively chosen in a repetitive portion of a program without repetitively effecting an interrupt handler.

DETAILED DESCRIPTION OF THE INVENTION

Figure 1:
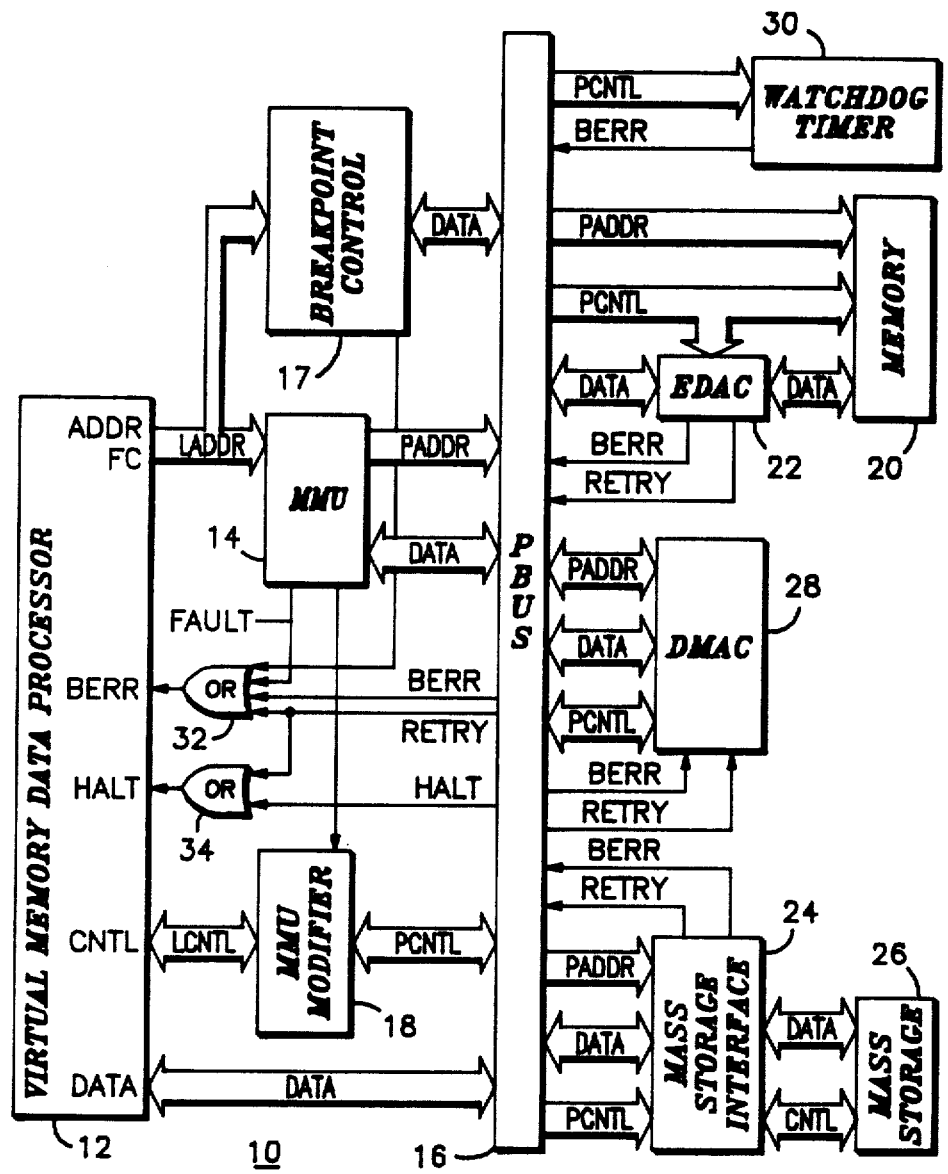
FIG. 1 is a block diagram of a system having the breakpoint capability of the present invention.

Shown in FIG. 1 is a virtual memory data processing system 10 wherein logical addresses (LADDR) issued by a virtual memory data processor (VMDP) 12 are mapped by a memory management unit (MMU) 14 to a corresponding physical address (PADDR) for output on a physical bus (PBUS) 16. Predetermined ones of the logical addresses may include breakpoint acknowledge cycles in response to a breakpoint instruction which are coupled to a breakpoint control circuit 17. Breakpoint control circuit 17 selectively implements predetermined breakpoints. An output of breakpoint control circuit 17 is coupled to physical bus 16. Simultaneously, the various logical access control signals (LCNTL) provided by VMDP 12 to control the access are converted to appropriately timed physical access control signals (PCNTL) by a modifier unit 18 under the control of MMU 14.

In response to a particular range of physical addresses (PADDR), memory 20 will cooperate with an error detection and correction circuit (EDAC) 22 to exchange data (DATA) with VMDP 12 in synchronization with the physical access control signals (PCNTL) on PBUS 16. Upon detecting an error in the data, EDAC 22 will either signal a bus error (BERR) or request VMDP 12 to retry (RETRY) the exchange, depending upon the type of error.

In response to a different physical address, mass storage interface 24 will cooperate with VDMP 12 to transfer data to or from mass storage 26. If an error occurs during the transfer, interface 24 may signal a bus error (BERR) or, if appropriate, request a retry (RETRY).

In response to yet another physical address, a direct memory access controller (DMAC) 28 will accept data from the VMDP 12 defining a data transfer operation. Upon being released to perform the operation, DMAC 28 will use appropriate PCNTL lines to periodically request VMDP 12 to relinquish control of the bus. Upon being granted control of the bus, the DMAC 28 will transfer a block of data within memory 20 or between memory 20 and mass storage 26. If an error is detected during any such transfer by either the EDAC 22 or mass storage interface 24, DMAC 28 will either abort or retry the transfer, depending upon whether BERR or RETRY was signaled.

In the event that the MMU 14 is unable to map a particular logical address (LADDR) into a corresponding physical address (PADDR), the MMU 14 will signal an access fault (FAULT). As a check for MMU 14, and for DMAC 28 as well, a watchdog timer 30 may be provided to signal a bus error (BERR) if no physical device has responded to a physical address (PADDR) within a suitable time period relative to the physical access control signals (PCNTL).

If, during a data access bus cycle, a RETRY is requested, OR gates 32 and 34 will respectively activate the BERR and HALT inputs of VMDP 12. In response to the simultaneous activation of both the BERR and HALT inputs thereof during a VMDP-controlled bus cycle, VMDP 12 will abort the current bus cycle and, upon the termination of the RETRY signal, retry the cycle.

If desired, operation of VMDP 12 may be externally controlled by judicious use of a HALT signal. In response to the activation of only the HALT input thereof via OR gate 34, VMDP 12 will halt at the end of the current bus cycle, and will resume operation only upon the termination of the HALT signal.

In response to the activation of only the BERR input thereof during a processor-controller bus cycle, VMDP 12 will abort the current bus cycle, internally save the contents of the status register, enter the supervisor state, turn off the trace state if on, and generate a bus error vector number. VMDP 12 will then stack into a supervisor stack area in memory 20 a block of information which reflects the current internal context of the processor, and then use the vector number to branch to an error handling portion of the supervisor program. This is the operation VMDP 12 performs in response to a bus error input signal, except for a bus error signal provided by breakpoint control circuit 17 in response to a break point acknowledge cycle generated by VMDP 12, indicating that a breakpoint is to be taken. Bus errors received during a breakpoint acknowledge cycle cause VMDP 12 to begin exception processing for an illegal instruction format as described below.

Up to this point, the operation of VMDP 12 is identical to the operation of Motorola's MC68000 microprocessor. However, VMDP 12 differs from the MC68000 primarily in the amount of information which is stacked in response to the assertion of BERR. The information stacked by the MC68000 consists of: the saved status register, the current contents of the program counter, the contents of the instruction register which is usually the first word of the currently executing instruction, the logical address which was being accessed by the aborted bus cycle, and the characteristics of the aborted bus cycle, i.e. read/write, instruction/data and function code. In addition to the above information, VMDP 12 is constructed to stack much more information about the internal machine state. If the exception handler is successful in resolving the error, the last instruction thereof will return control of VMDP 12 to the aborted program. During the execution of this instruction, the additional stacked information is retrieved and loaded into the appropriate portions of VMDP 12 to restore the state which existed at the time the bus error occurred.

Under certain circumstances, such as when an access is attempted to a non-existent peripheral, the supervisor may choose to perform the request access but utilize a different resource. If the faulted access was a read, the supervisor can store the accessed information in the appropriate location in the stack. To make it appear to the faulted instruction as if the non-existent peripheral had actually responded, the supervisor can set a flag in the stack indicating that the access has already been performed. Just before resuming execution of the faulted instruction, VMDP 12 can check the flag and, if set, can resume instruction execution as if the access had just been successfully completed. Thus, the faulted program will be unaware that the accessed resource is not actually present.

Figure 2:
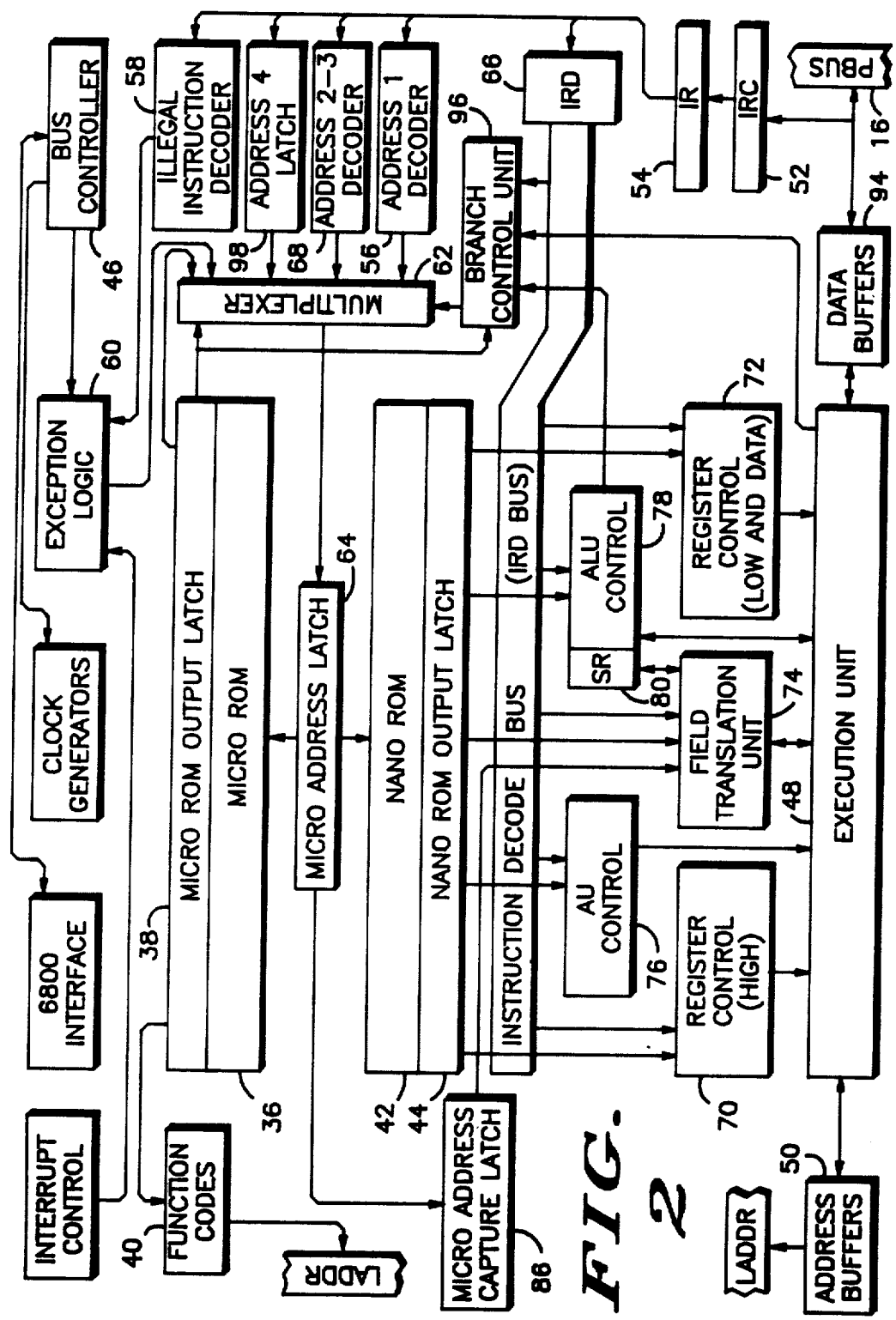
FIG. 2 is a block diagram of the virtual memory data processor of FIG. 1.

The preferred operation of VMDP 12 will be described with reference to FIG. 2 which illustrates the internal organization of a microprogrammable embodiment of VMDP 12. Since the illustrated form of VMDP 12 is very similar to the Motorola MC68000 microprocessor described in detail in the several U.S. patents cited hereafter, the common operational aspects will be described rather broadly. Once a general understanding of the internal architecture of VMDP 12 is established, the discussion will focus on the unique aspects which distinguish VMDP 12 from the MC68000, and enable the former to support virtual memory.

The VMDP 12, like the MC68000, is a pipelined, microprogrammed data processor. In a pipelined processor, each instruction is typically fetched during the execution of the preceding instruction, and the interpretation of the fetched instruction usually begins before the end of the preceding instruction. In a microprogrammed data processor, each instruction is executed as a sequence of microinstructions which perform small pieces of the operation defined by the instruction. If desired, user instructions may be thought of as microinstructions. In the MC68000 and VMDP 12, each microinstruction comprises a microword which controls microinstruction sequencing and function code generation, and a corresponding nanoword which controls the actual routing of information between functional units and the actuation of special function units within VMDP 12. With this in mind, a typical instruction execution cycle will be described.

At an appropriate time during the execution of each instruction, a prefetch microinstruction will be executed. The microword portion thereof will, upon being loaded from micro ROM 36 into micro ROM output latch 38, enable function code buffers 40 to output a function code (FC) portion of the logical address (LADDR) indicating an instruction cycle. Upon being simultaneously loaded from nano ROM 42 into nano ROM output latch 44, the corresponding nanoword requests bus controller 46 to perform an instruction fetch bus cycle, and instructs execution unit 48 to provide the logical address of the first word of the next instruction to address buffers 50. Upon obtaining control of the PBUS 16, bus controller 46 will enable address buffers 50 to output the address portion of the logical address (LADDR). Shortly thereafter, bus controller 46 will provide appropriate data strobes (some of the LCNTL singals) to activate memory 20. When the memory 20 has provided the requested information, bus controller 46 enables instruction register capture (IRC) 52 to input the first word of the next instruction from PBUS 16. At a later point in the execution of the current instruction, another microinstruction will be executed to transfer the first word of the next instruction from IRC 52 into instruction register (IR) 54, and to load the next word from memory 20 into IRC 52. Depending upon the type of instruction in IR 54, the word in IRC 52 may be immediate data, the address of an operand, or the first word of a subsequent instruction.

In response to the execution of a breakpoint instruction, VMDP 12 executes a breakpoint acknowledge cycle and has the ability to selectively update IR 54 from data received during the breakpoint acknowledge bus cycle. When the breakpoint is not desired to be taken, breakpoint control circuit 17 provides an instruction opcode. This data is then used as the instruction to be executed, is loaded into IR 54, and is decoded by an address 1 decoder 56 and an illegal instruction decoder 58 as described below. If the breakpoint is desired to be recognized, the breakpoint control circuit 17 provides no data, and simply asserts the BERR signal.

Details of a suitable instruction set and the microinstruction sequences thereof are set forth in U.S. Pat. No. 4,325,121 entitled, "Two Level Control Store for Microprogrammed Data Processor", issued Apr. 13, 1982 to Gunter et al.

As soon as the first word of the next instruction has been loaded into IR 54, address 1 decoder 56 begins decoding certain control fields in the instruction to determine the micro address of the first microinstruction in the initial microsequence of the particular instruction in IR 54. Simultaneously, illegal instruction decoder 58 will begin examining the format of the instruction in IR 54. If the format is determined to be incorrect, illegal instruction decoder 58 will provide the micro address of the first microinstruction of an illegal instruction microsequence. In response to the format error, exception logic 60 will force multiplexor 62 to substitute the micro address provided by illegal instruction decoder 58 for the micro address provided by address 1 decoder 56. Thus, upon execution of the last microinstruction of the currently executing instruction, the microword portion thereof may enable multiplexor 62 to provide an appropriate micro address to micro address latch 64, while the nanoword portion thereof enables instruction register decoder (IRD) 66 to load the first word of the next instruction from IR 54. Upon the selected micro address being loaded into micro address latch 64, micro ROM 36 will output a respective microword to micro ROM output latch 38 and nano ROM 42 will output a corresponding nanoword to nano ROM output latch 44.

Generally, a portion of each microword which is loaded into micro ROM output latch 38 specifies the micro address of the next microinstruction to be executed, while another portion determines which of the alternative micro addresses will be selected by multiplexor 62 for input to micro address latch 64. In certain instructions, more than one microsequence must be executed to accomplish the specified operation. These tasks, such as indirect address resolution, are generally specified using additional control fields within the instruction. The micro addresses of the first microinstructions for these additional microsequences are developed by address § decoder 68 using control information in IR 54. In the simpler form of such instructions, the first microsequence will typically perform some preparatory task and then enable multiplexor 62 to select the micro address of the microsequence which will perform the actual operation as developed by the address 3 portion of address § decoder 68. In more complex forms of such instructions, the first microsequence will perform the first preparatory task and then will enable multiplexor 62 to select the micro address of the next preparatory microsequence a devleoped by the address 2 portion of address § decoder 68. Upon performing this additional preparatory task, the second microsequence then enables multiplexor 62 to select the micro address of the microsequence which will perform the actual operation as developed by the address 3 portion of address § decoder 68. In any event, the last microinstruction in the last microsequence of each instruction will enable multiplexor 62 to select the micro address of the first microinstruction of the next instruction as developed by address 1 decoder 56. In this manner, execution of each instruction will proceed through an appropriate sequence of microinstructions. A more thorough explanation of the micro address sequence selection mechanism is given in U.S. Pat. No. 4,342,078 entitled "Instruction Register Sequence Decoder for Microprogrammed Data Processor" issued July 27, 1982 to Tredennick et al.

In contrast to the microwords, the nanowords which are loaded into nano ROM output latch 44 indirectly control the routing of operands into and, if necessary, between the several registers in the execution unit 48 by exercising control over register control (high) 70 and register control (low and data) 72. In certain circumstances, the nanoword enables field translation unit 74 to extract particular bit fields from the instruction in IRD 66 for input to the execution 48. The nanowords also indirectly control effective address calculations and actual operand calculations within the execution unit 48 by exercising control over AU control 76 and ALU control 78. In appropriate circumstances, the nanowords enable ALU control 78 to store into status register SR the condition codes which result from each operand calculation by execution unit 48. A more detailed explanation of ALU control 78 is given in U.S. Pat. No. 4,312,034 entitled "ALU and Condition Code Control Unit for Data Processor" issued Jan. 19, 1982 to Gunter et al.

Figure 3:
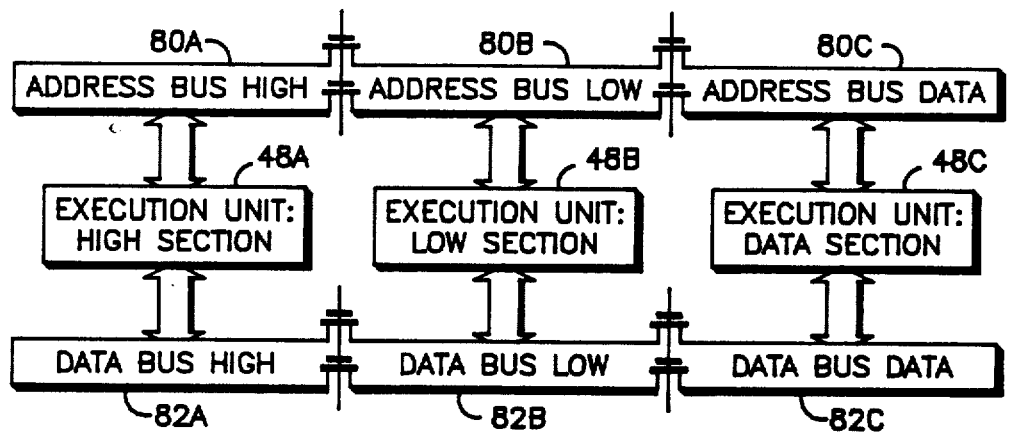
FIG. 3 is a block diagram of the execution unit of the virtual memory data processor of FIG. 2.

As can be seen in FIG. 3, the execution unit 48 in VMDP 12, like the execution unit in the MC68000, comprises a high section 48A, a low section 48B, and a data section 48C, which can be selectively connected to respective segments of address and data buses 80 and 82, respectively. Since execution unit 48 is so similar to the execution unit of the MC68000 as described in U.S. Pat. No. 4,296,469, the common functional units will be described only briefly, followed by a more detailed description of the new elements which allow VMDP 12 to support virtual memory.

Figure 4:
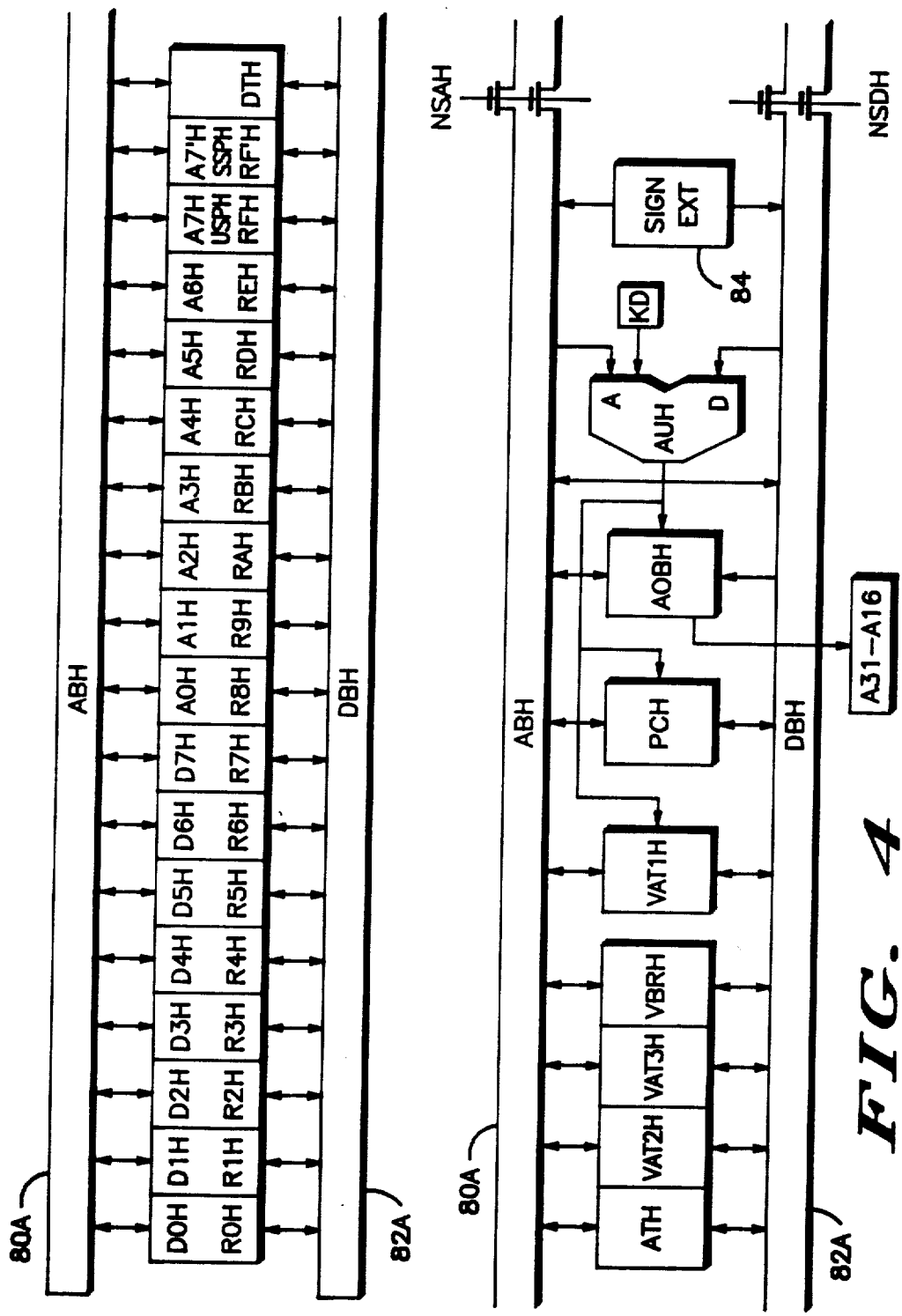
FIG. 4 is a block diagram of the high section of the execution unit of FIG. 3.
Figure 5:
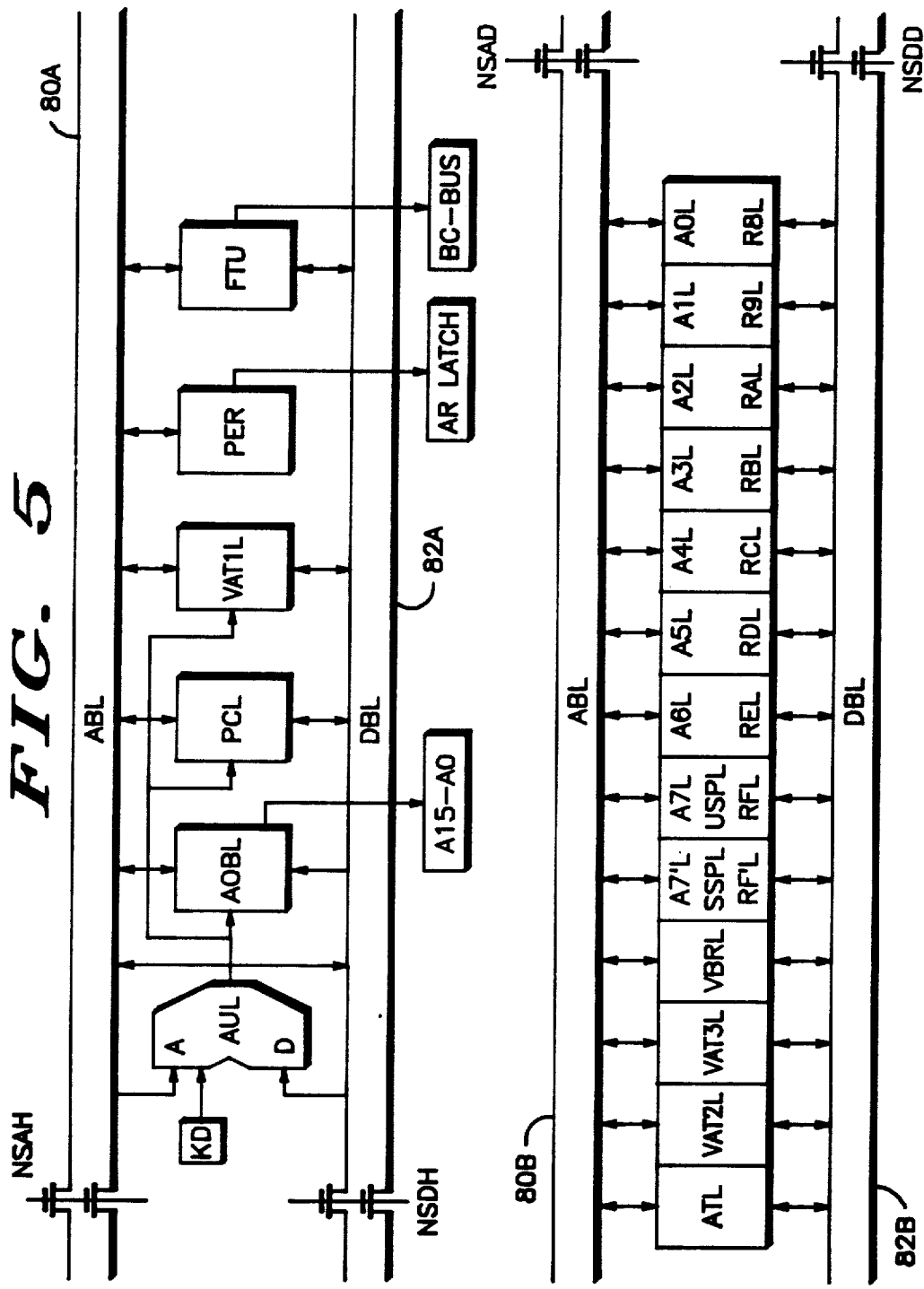
FIG. 5 is a block diagram of the low section of the execution unit of FIG. 3.
Figure 6:
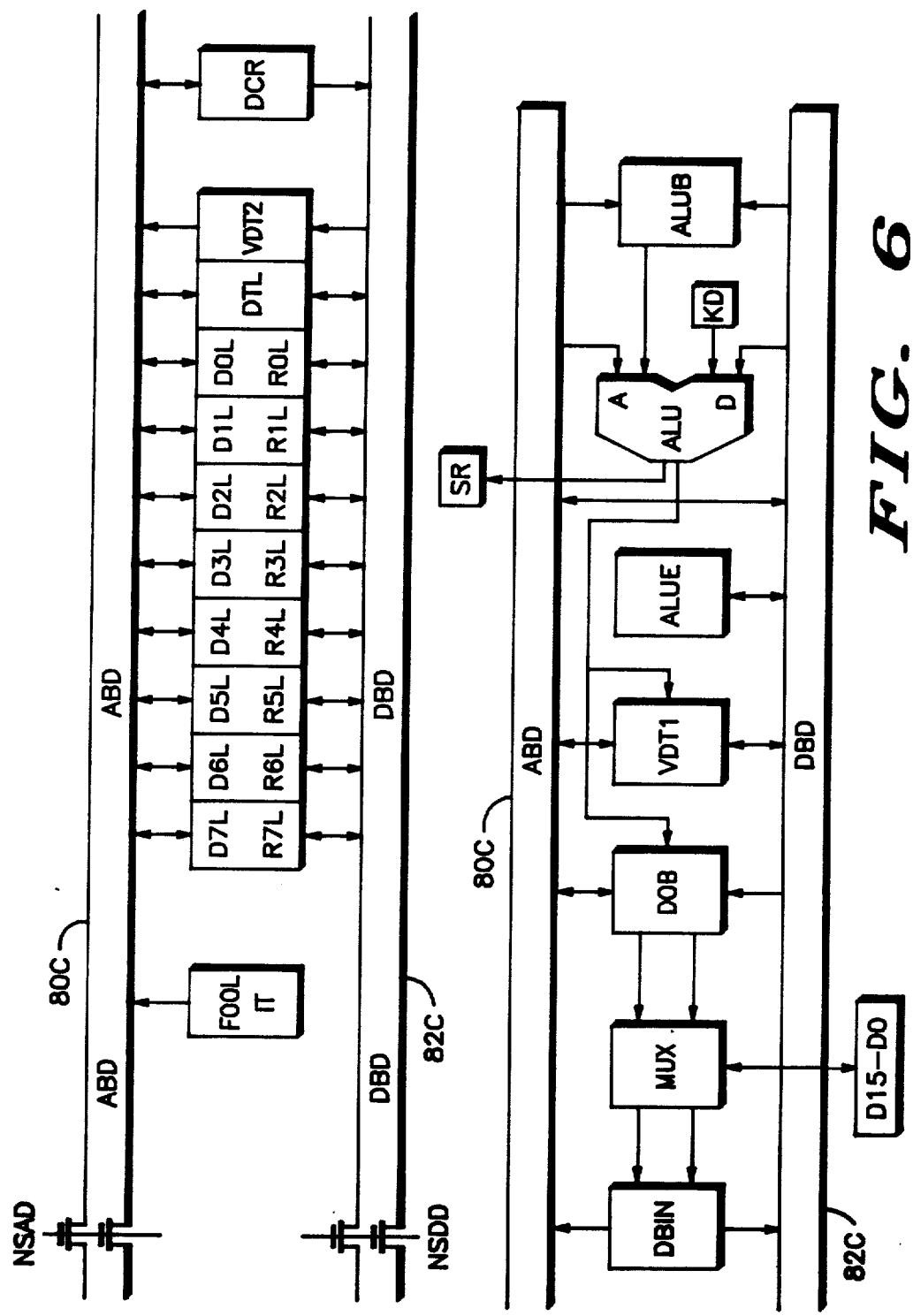
FIG. 6 is a block diagram of the data section of the execution unit of FIG. 3.

As shown in FIG. 4, the high section 48A is comprised primarily of a set of nine high address registers A0H-A7'H for storing the most significant 16 bits of 32 bit address operands, a set of eight high data registers D0H-D7H for storing the most significant 16 bits of 32 bit data operands, a temporary high address register ATH, a temporary high data register DTH, an arithmetic unit high AUH for performing arithmetic calculations on operands provided on the high section of address and data buses 80 and 82, a sign extension circuit 84 for allowing 32 bit operations on 16 bit operands, and the most significant 16 bits of the program counter PCH and address output buffers AOBH. As shown in FIG. 5, the low section 48B is comprised primarily of a set of nine low address registers A0L-A7'L for storing the least significant 16 bits of 32 bit address operands, an arithmetic unit low AUL for performing arithmetic calculations on operands provided on the low section of address and data buses 80 and 82, a priority encoder register PER used in multi-register move operations, and the least significant 16 bits of the program counter PCL and address output buffers AOBL. FIG. 5 also illustrates the relationship of an FTU register portion of field translation unit 74 to the low sections of address and data buses 80 and 82. As shown in FIG. 6, the data section 48C is comprised primarily of a set of eight low data registers D0L-D7L for storing 16 bit operands which may be the least significant 16 bits of 32 bit data operands, a decoder register DCR for generating 16 bit operand masks, an arithmetic and logic unit ALU for performing arithmetic and logical operations on operands provided on the data section of address and data buses 80 and 82, an ALU buffer register ALUB, an ALU extension register ALUE for multiword shift operations, and multiplexed data input and output buffers DBIN and DOB, respectively.

Thus far, VMDP 12 has been described in terms of the hardware features which are common with the MC68000. VMDP 12 also responds to error conditions in a manner somewhat similar to the MC68000. Recall that MMU 14 will signal an address error by generating a FAULT signal, while the other peripheral circuits report bus errors by issuing a BERR signal. In either event, VMDP 12 will receive a BERR signal via OR gate 32. In response to the BERR signal, bus controller 46 will notify exception logic 60 of the error and then orderly terminate the faulty bus cycle. Exception logic 60 then provides multiplexor 62 with the micro address of the bus error exception handler microsequence to be forced into the micro address latch 64. At this point, the MC68000 would simply load the micro address provided by exception logic 60 into micro address latch 64 and control would pass to the exception handler microsequence to stack out the following information:

SSWB: Special System Status Word Bus;
AOBH: Access Address High;
AOBL: Access Address Low;
IRD: Instruction Register Decode;
SR: Status Register;
PCH: Program Counter High; and
PCL: Program Counter Low.

Figure 7:
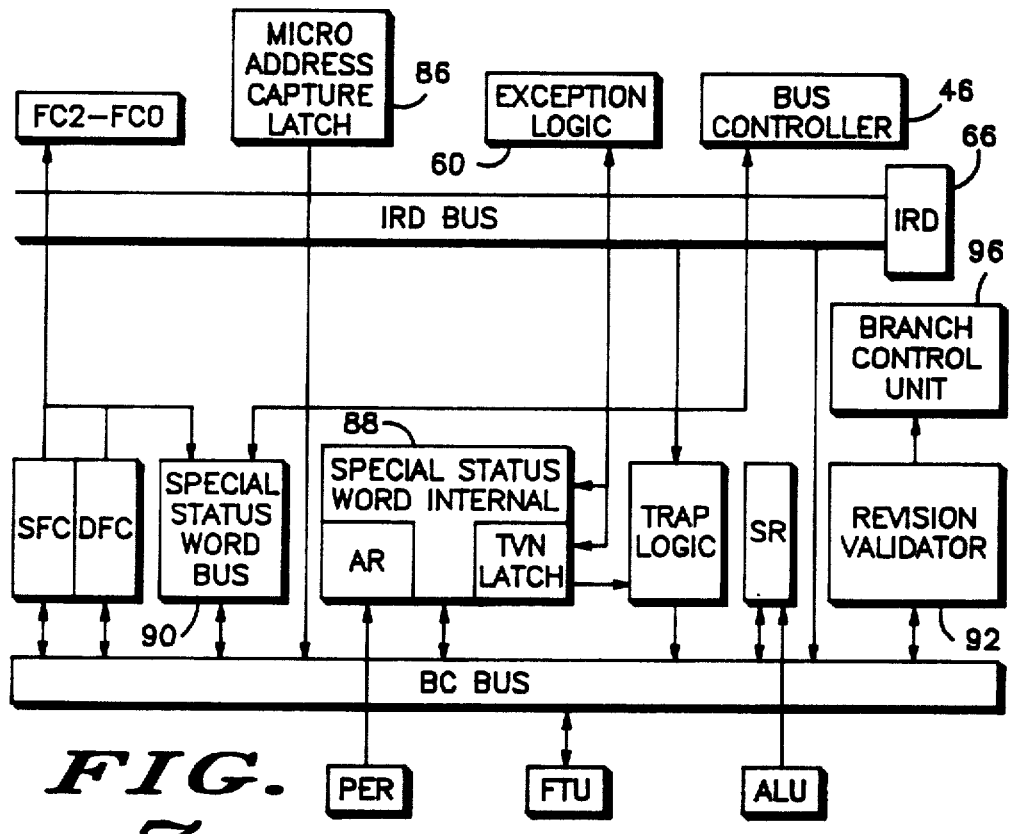
FIG. 7 is a block diagram illustrating the relationship of the field translation unit of the virtual memory data processor of FIG. 2 to other functional units therein.

While this information is ordinarily adequate to determine the cause of the error, this information is not sufficient to allow the present state to be restored after the error has been resolved. Accordingly, VMDP 12 internally saves additional information about the current state thereof, before loading the micro address of the exception handler microsequence. To accomplish this, VMDP 12 has several additional registers for capturing the necessary state information, and some additional access paths are provided to certain existing registers. For example, as shown in FIG. 2, VMDP 12 has a micro address capture latch 86 for storing the micro address in the micro address latch 64 at unit 74, a special status word internal (SSWI) register 88 is provided as shown in FIG. 7 to save the following:

PR: Trap Privilege Exception Latch (from exception logic 60);
TR: Trap Trace Exception Latch (from exception logic 60);
TP: Trace Pending Latch (from SR);
LP: Loop Mode Latch (new bit);
HX: Hidden-X Status Bit (from ALU);
ARx: Priority Encoder Output Register Selector (from PER); and
TVN: Trap Vector Number Latch (from exception logic 60).

In addition, the special status word bus (SSWB) register 90 in field translation unit 74, which in the MC68000 saved only:

R/W: Read/Write (R/W); and
FC: Function Code for faulted access;

now saves the following additional information:

IF: nanoROM bit NIRC (instruction fetch to IRC);
DF: nanoROM bit NDBI (data fetch to DBIN);
RM: Read-Modify-Write cycle;
HB: nanoROM bit NIOH (high byte transfer from DOB or to DBIN); and
BY: byte/word transfer.

Once this additional state information has been latched, VMDP 12 loads the micro address provided by exception logic 60 into micro address latch 64 and begins executing the exception handler microsequence. In the exception handler microsequence of VMDP 12, the initial microinstructions must clear the address calculation and output paths in execution unit 48 so that the stack address may be safely calculated and provided to MMU 14. Accordingly, several additional registers are provided in the execution unit 48 to store the existing address, data and control information: in the high section 48A shown in FIG. 4, three virtual address temporary high registers VAT1H-VAT3H are provided to facilitate capture of the output of AUH and the address in AOBH; in the low section 48B shown in FIG. 5, three virtual address temporary low registers VAT1L-VAT3L are provided to allow capture of the output of AUL and the address in AOBL; and, in the data section 48C shown in FIG. 6, two virtual data temporary registers VDT1-VDT2 are provided to store the control information in FTU and the data in DOB. Having cleared the execution unit 48, the exception handler calculates the stack address and proceeds to stack the following information:

SR: Status Register;
PCH: Program Counter High;
PCL: Program Counter Low;
VOR: Stack Frame Format and Vector Offset;
SSWB: Special System Status Word Bus;
AOBH: Access Address High;
AOBL: Access Address Low;
DOB: Data Output Buffer;
DIB: Data Input Buffer;
IRC: Instruction Register Capture;

MAL: Micro Address Capture Latch;
ALUB: Contents of ALUB;
FTU: Field Translate Unit Register;
ATH: Address Temporary High
ALU: ALU Output Latch
ATL: Address Temporary Low;
AUH: AU Latch High;
AUL: AU Latch Low;
DCRL: Decoder Latch;
PERL: PER Output Register;
SSWI: Special Status Word Internal
IR: Instruction Register
DTH: Data Temporary High;
DTL: Data Temporary Low;
IRD: Instruction Register Decode; and
ALUE: ALUE Register.

The exception handler microsequence then vectors to the error recovery routine in the supervisor program. Using the stacked state information, the supervisor program can determine the cause of the fault, and if appropriate, attempt to fix the problem. For example, an access to a logical address which has no corresponding physical address may simply require that a block of program/data be loaded from mass storage 26 into memory 20. Of course, other processing may also be performed before the faulted program is restarted.

To return control to a program which has been suspended, the supervisor program in both the MC68000 and VMDP 12 executed a return from exception (RTE) instruction. In the MC68000, this instruction will be executed only if the exception was of the type which occurred on instruction boundaries. Thus, the microsequence for this instruction could simply reload the status register SR and program counter PCH-PCL from the stack, and then pass control to the instruction whose address is in the program counter. In VMDP 12, this instruction is also used to return from access faults which typically occur during execution of an instruction. Accordingly, the initial microinstructions in this microsequence fetch the VOR word from the stack to determine the stack frame format. If the short format is indicated, the microsequence will proceed as in the MC68000. If, on the other hand, the long format is indicated, several other words are fetched from the stack to assure that the full frame is available in memory. If the frame format is neither short nor long, VMDP 12 will assume that the stack frame is either incorrect or was generated by an incompatible type of processor and will transfer control to a stack frame format error exception handler microsequence. If another fault is generated at this stage, indicating that a portion of the stack frame has been inadvertantly swapped out of memory 20, the same access fault handling procedure will be used to retrieve the rest of the stack.

During the microsequence which stacks the state information, the micro address contained in the micro address capture latch 86 is coupled to the FTU via a portion of the BC bus, as shown in FIG. 7. Simultaneously, revision validator 92 impresses on the available portion of the BC bus a code which uniquely indentifies the version of the microcode contained within VMDP 12. This combined word is subsequently transferred into DOB in the data section 48C of the execution unit 48 for output via data buffers 94 to memory 20. During the validation phase of the instruction continuation microsequence, the MAL word is fetched from the stack and loaded into both IRC 52 and DBIN in the data section 48C of the execution unit 48. From DBIN, MAL is transferred to FTU and coupled to the BC bus. Revision validator 92 then compares the version number portion of MAL to the internal version number. If they are not the same, revision validator 92 will signal branch control unit 96 to transfer control to the stack frame format exception handler microsequence. Otherwise, revision validator 92 will simply allow the microsequence to load the micro address portion of MAL into address 4 latch 98.

Once the stack frame has been determined to be valid, the microsequence will enter a critical phase where any fault will be considered a double fault and VMDP 12 will terminate processing until externally reset. During this phase, the rest of the information in the stack is fetched and either reloaded into the original locations or into the several temporary registers. For example, the contents of the micro address latch 64 which were captured by the micro address capture latch 86 will be loaded into address 4 latch 98. However, only after the last stack access are the contents of AUH-AUL and SR restored from the temporary registers. The last microinstruction in this instruction continuation microsequence restores the contents of AOBH, AOBL, FTU, and DOB, signals bus controller 46 to restart the faulted bus cycle using the information in SSWB 90, and requests multiplexor 62 to select the micro address in address 4 latch 98.

In the preferred form, bus controller 46 will respond to the restart signal provided by the last microinstruction of the instruction continuation microsequence by examining a rerun bit RR in SSWB 90. If the supervisor has not set the RR bit in the stack, the bus controller 46 will proceed to rerun the faulted bus cycle under control of the other information in SSWB 90, and then signal exception logic 60 when the cycle has been successfully completed. If, on the other hand, the supervisor has set the RR bit, the bus controller 46 will not rerun the bus cycle, but will simply signal exception logic 60 that the cycle is complete. In response to the cycle complete signal, exception logic 60 will enable multiplexor 62 to output the micro address in address 4 latch 98 to micro address latch 64. The faulted instruction will then resume control of VMDP 12 as if the fault had never occurred.

VMDP 12, unlike the MC68000, is also capable of creating the illusion that the currently executing user program is executing in the supervisor state. This has been achieved by making all instructions which access the supervisor/user bit in status register SR into privileged instructions. Thus, whenever an attempt is made by the user program to modify or even read the supervisor/user bit, control will automatically revert to the supervisor. The supervisor will then be able to prepare and return a suitably modified image of SR to the user program. The user program, being insulated from the true SR, can then pretend that it is the supervisor. With the help of the true supervisor, this pseudo supervisor can control the execution of other user program. This capability to control accesses to both real and non-existent system resources from user programs, whether true user or pseudo supervisor, enables the user VMDP 12 to create a virtual machine environment.

Figure 8:
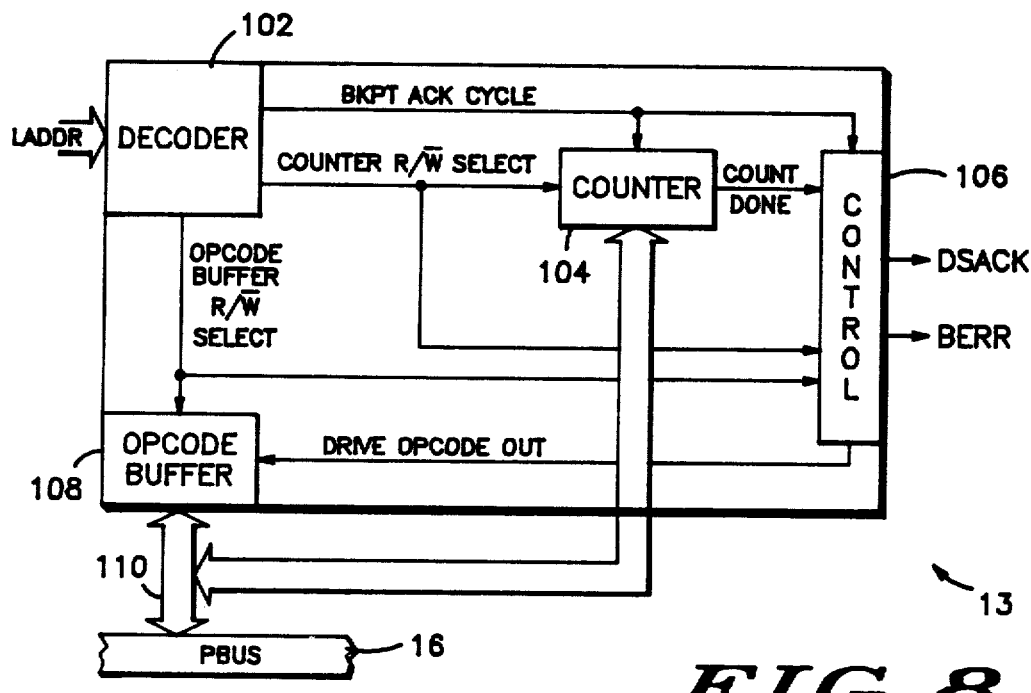
FIG. 8 is a block diagram illustrating a typical breakpoint control circuit of FIG. 1.

Up until this point, the functionality of VMDP system 10 has been discussed. Shown in FIG. 8 is a block diagram of a breakpoint control circuit 13 which may be substituted for breakpoint control circuit 17 of FIG. 1 and which functions to decode the presence of a breakpoint acknowledge cycle which is internally generated by VMDP 12 during execution of a breakpoint instruction. The breakpoint instruction replaces the normal instruction opcode at the location in memory where a breakpoint is desired to be set. Logical address signals, LADDR, some of which indicate a breakpoint acknowledge cycle, are coupled to an input of a decoder 102. Due to the existence of an on board instruction cache containing breakpoint information in VMDP 12, the number of times a memory location is physically accessed may not be monitored by hardware external to VMDP 12 for purposes of identifying when a breakpoint is to be taken. An output of decoder 102 couples a breakpoint acknowledge cycle signal to a first input of a counter 104 and a first input of a control circuit 106. A counter read/write select signal is coupled from a second output of decoder 102 to both a second input of counter 104 and a second input of control circuit 106. A third output of decoder 102 provides an opcode buffer read/write select signal to both a third input of control circuit 106 and to a first input of an opcode buffer circuit 108. An output of counter 104 representing a signal indicating that a count is completed is coupled to a fourth input of control circuit 106. A first output of control circuit 106 provides a data acknowledge signal, DSACK. A second output of control circuit 106 provides a bus error signal, BERR, and a third output of control circuit 106 provides a drive opcode signal to a second input of opcode buffer circuit 108. A multidirectional bus 110 is coupled between PBUS 16, an input/output terminal of opcode buffer 108 and an input/outpupt terminal of counter 104.

Figure 9:
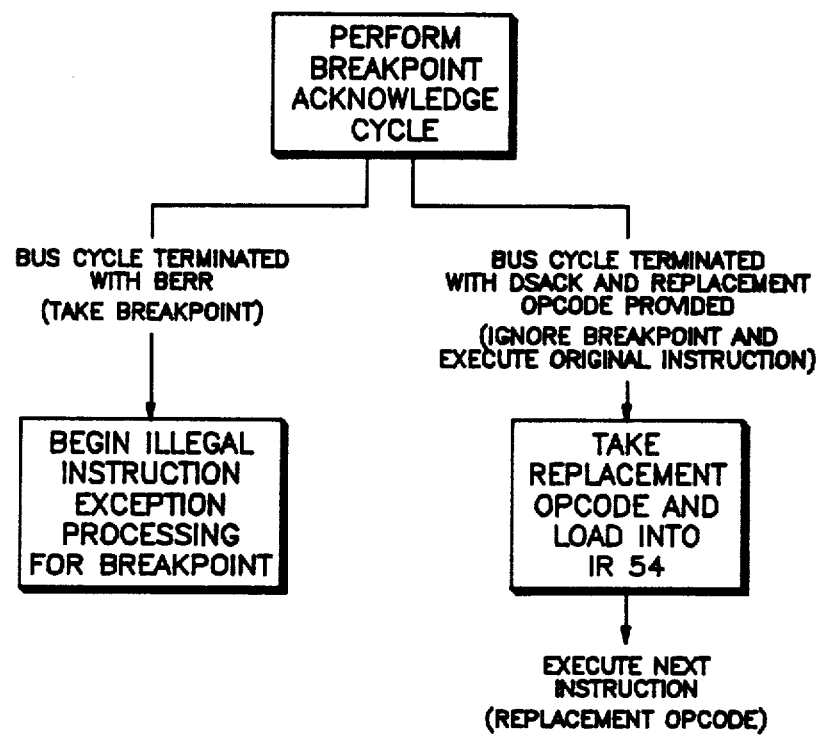
FIG. 9 is a flow chart of software micro-instructions which implement a breakpoint instruction.

In operation, when a breakpoint acknowledge cycle is recognized by decoder 102, an acknowledge cycle signal is coupled to counter 104 and control circuit 106. The decoder breakpoint acknowledge cycle signal is provided by VMDP 12 in the form of a predetermined function code having a value such as "111" and predetermined address bits having predetermined values such as "0000". Counter 104 is set to a predetermined count so that a breakpoint may be taken at a predetermined time. As a result, breakpoints may be selectively made after a predetermined number of repetitions of a portion of a program being executed by VMDP 12. If counter 104 has not counted to the predetermined count, control circuit 106 provides a data acknowledge signal DSACK and a replacement instruction opcode to VMDP 12 rather than a bus error signal BERR. VMDP 12 initializes counter 104 and control circuit 106 via decoder 102 and PBUS 16. In this way, counter 104 determines the number of times a breakpoint will be ignored before being executed. Similarly, VMDP 12 initializes opcode buffer circuit 108 via PBUS 16 and an opcode buffer read/write select signal generated by decoder 102. An opcode representing the instruction which is being replaced by the breakpoint instruction is initially written into opcode buffer 108 in response to the read/write signal. When control circuit 106 provides a "drive opcode out" signal to opcode buffer 108, buffer 108 reads out the predetermined opcode to VMDP 12 via PBUS 16. The opcode is associated with the instruction which VMDP 12 would be normally executing in the absence of a breakpoint instruction. After counter 104 has counted to the predetermined count desired for a breakpoint to occur, control circuit 106 provides a bus error signal which is coupled to OR gate 32 of FIG. 1 and effects an interrupt to occur in the manner previously described. An exception handler is effected and the breakpoint is processed. Shown in FIG. 9 is an instruction flow chart illustrating the breakpoint operation in micro-instruction form. In this manner, selective breakpoint operation is achieved without entering an exception handler every time a breakpoint instruction is encountered in repetitive iterations of a program being processed by a data processing system.

What is claimed is:

1. In a data processor adapted to communicate with a peripheral device, the data processor comprising:
   an instruction register for storing an instruction to be executed by said data processor; and
   instruction execution control means, for
   (1) executing instructions stored in the instruction register, and, in response to executing a breakpoint instruction,
   (2) providing a control signal to said peripheral device;
   (3) receiving a first response from said peripheral device and
   (4a) either performing a breakpoint, if the first response is of a first type;
   (4b) or
       sorting a successive instruction in the instruction register, if the first response is of a second type;
   the improvement wherein the instruction execution control means also receives a second response from said peripheral device, the instruction execution control means storing said second response in said instruction register as said successive instruction if said first response is of said second type.

2. A method of communicating operands between a data processor and a peripheral device, comprising the steps of:
   storing an instruction to be executed by the data processor in an instruction register;
   executing instructions stored in the instruction register;
   executing a breakpoint instruction as one of the instructions stored in the instruction register;
   providing a control signal from the data processor to the peripheral device in response to executing the breakpoint instruction;
   receiving a first response from the peripheral device;
   performing a breakpoint in response to the first response being of a first type or storing a successive instruction in the instruction register in response to the first response being of a second type; and
   receiving and storing a second response from the peripheral device as the successive instruction if the first response is of the second type.

3. A data processor having selective breakpoint capability with minimal overhead by communicating operands with a peripheral device, comprising:
   register means for storing instructions to be executed by the data processor; and
   control means for controlling the execution of the stored instructions in the register means, for directing the peripheral device to either send a control signal directing a breakpoint or send a successive instruction in response to executing a predetermined breakpoint instruction, for receiving and storing the successive instruction in the register means as a next instruction to be executed, and for executing the successive instruction.

4. A data processing system comprising the data processor and peripheral device of claim 1, the peripheral device being coupled to the data processing system via a data bus and comprising:

decoder means having an input for receiving address signals from the data processor, a predetermined one of the address signals indicating a breakpoint instruction, and having a first output for providing a breakpoint acknowledge signal, a second output for providing an initialization signal, and a third output for providing a read/write control signal;

counter means having a first input for receiving the breakpoint acknowledge signal, a second input for receiving the initialization signal, and an output for indicating when a predetermined count has been completed thereby selectively indicating when a breakpoint should be taken;

a control circuit having a first input for receiving the breakpoint acknowledge signal, a second input for receiving the initialization signal, a third input coupled to the output of the counter means, a first output for providing the first type of first response, a second output for providing the second type of first response, and a third output for providing a data bus control signal; and buffer means having a first input for receiving the data bus control signal, a second input for receiving the read/write control signal, and an output for providing the second response.

5. The method of claim 2 further comprising the step of:

reexecuting the breakpoint instruction a predetermined plurality of times before performing the breakpoint.

* * * * *

UNITED STATES PATENT AND TRADEMARK OFFICE
CERTIFICATE OF CORRECTION

PATENT NO.   : 4,635,193
DATED        : January 6, 1987
INVENTOR(S)  : William C. Moyer et al It is certified that error appears in the above-identified patent and that said Letters Patent is hereby corrected as shown below:

In column 12, line 24, change "sorting" to --storing--.

Signed and Sealed this

Thirty-first Day of March, 1987

Attest:

DONALD J. QUIGG

*Attesting Officer*   *Commissioner of Patents and Trademarks*